United States Patent [19]

Yamamoto et al.

[11] Patent Number: 4,926,324
[45] Date of Patent: May 15, 1990

[54] I/O CONTROL SYSTEM AND METHOD

[75] Inventors: Akira Yamamoto; Miho Motoyama; Hiroyuki Kitajima, all of Yokohama; Takashi Doi, Hadano; Toshifumi Nishimura, Minami-ashigara, all of Japan

[73] Assignee: Hitachi, Ltd., Tokyo, Japan

[21] Appl. No.: 293,555

[22] Filed: Jan. 5, 1989

Related U.S. Application Data

[63] Continuation of Ser. No. 830,835, Feb. 19, 1986, abandoned.

[30] Foreign Application Priority Data

Feb. 28, 1985 [JP] Japan .................. 60-39868
May 10, 1985 [JP] Japan .................. 60-97739

[51] Int. Cl.$^5$ .............................................. G06F 3/00
[52] U.S. Cl. .......................... 364/200; 364/238.3; 364/271.1
[58] Field of Search ... 364/200 MS File, 900 MS File

[56] References Cited

U.S. PATENT DOCUMENTS

| | | | |
|---|---|---|---|
| 4,016,548 | 4/1977 | Law et al. ...................... | 364/200 |
| 4,053,950 | 10/1977 | Bourke et al. ................ | 364/200 |
| 4,112,490 | 9/1978 | Pohlman et al. ............... | 364/200 |
| 4,138,732 | 2/1979 | Suzuki et al. ................. | 364/900 |
| 4,159,516 | 6/1979 | Henrion et al. ............... | 364/200 |
| 4,232,294 | 11/1980 | Burke et al. ................... | 364/200 |
| 4,408,272 | 10/1983 | Walters et al. ................ | 364/200 |
| 4,423,480 | 12/1983 | Bauer et al. .................. | 364/200 |
| 4,451,884 | 5/1984 | Heath et al. .................. | 364/200 |
| 4,484,263 | 11/1984 | Olson et al. .................. | 364/200 |
| 4,534,011 | 8/1985 | Andrews et al. .............. | 364/900 |
| 4,858,108 | 8/1989 | Ogawa et al. ................. | 364/200 |
| 4,860,193 | 8/1989 | Bentley et al. ................ | 364/1 |
| 4,864,532 | 9/1989 | Reeve et al. .................. | 364/900 |

Primary Examiner—Gareth D. Shaw
Assistant Examiner—Rebecca L. Rudolph
Attorney, Agent, or Firm—Antonelli, Terry, Stout & Kraus

[57] ABSTRACT

An I/O control system includes an I/O control unit, a plurality of I/O devices, the start process prior to a data transfer process of the I/O device being off-line processed from the I/O control unit, and a data transfer path for data transferring to the I/O device, the data transfer being performed for one I/O device at a time. The I/O control unit controls an I/O device in such a way that the start process of the I/O device completes at the time when another I/O device under data transfer completes its data transfer, thus improving the utilization of a data transfer path.

22 Claims, 16 Drawing Sheets

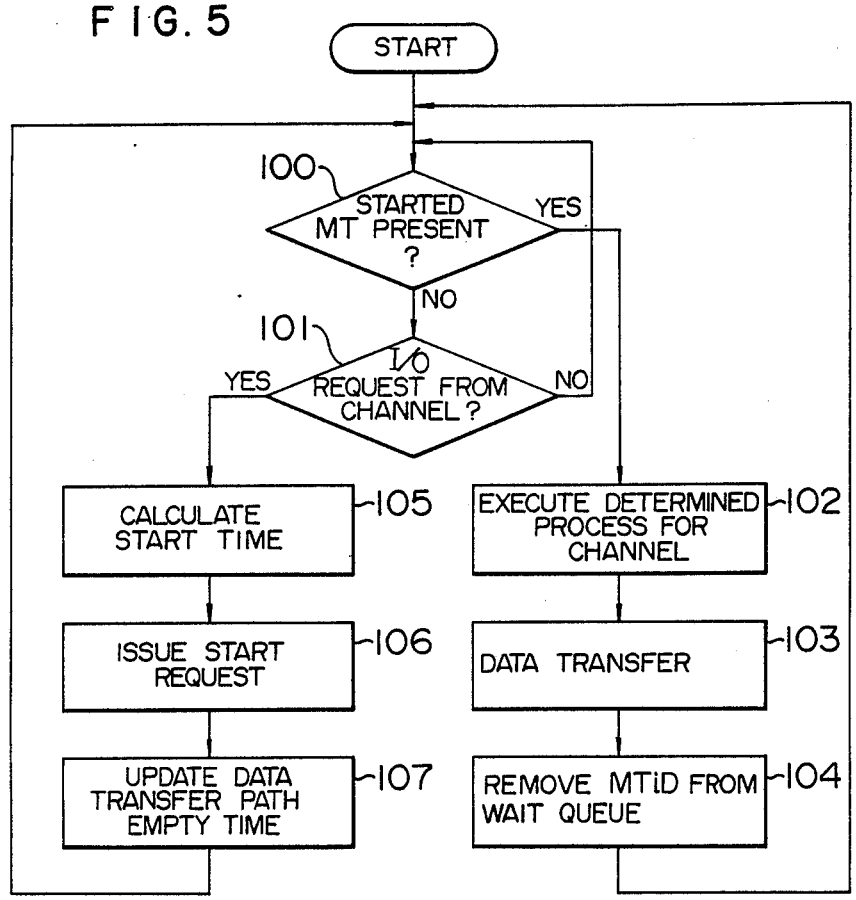

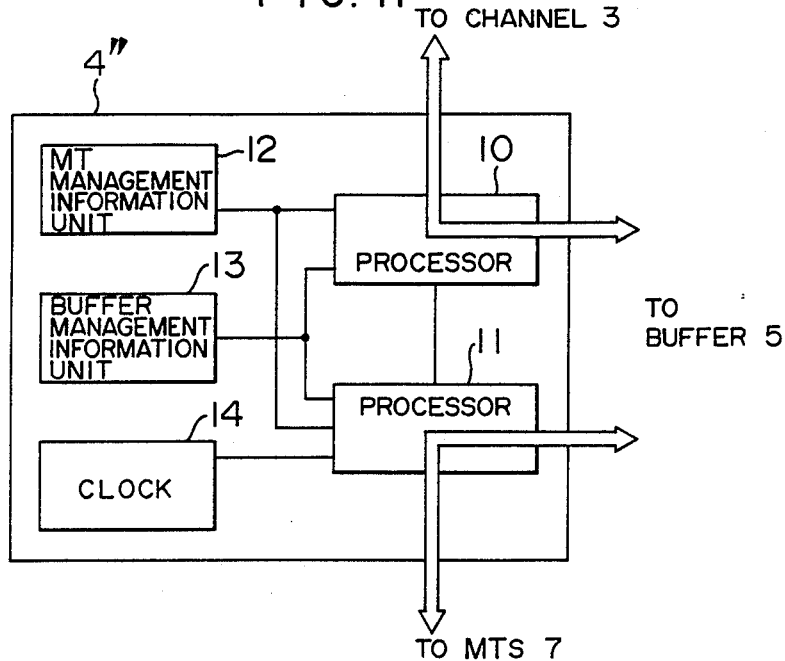

I/O CONTROL SYSTEM AND METHOD

This application is a continuation of Ser. No. 06/830,835, filed Feb. 19, 1986.

BACKGROUND OF THE INVENTION

The present invention relates to an I/O (Input/Output) control system and method, and more particularly to a start control system and method for an input/output device, the start control being off-line processed from an I/O control unit prior to a data transfer process.

A magnetic tape of a conventional magnetic tape unit provided with a vacuum column, which is essential for a high speed process, can be started at a high speed. However, a cartridge type magnetic tape unit is not provided with such a vacuum column to make it light in weight and small in size. In view of this, the start process is off-line processed and thereafter, when a data transfer becomes possible, the magnetic tape unit is reconnected to the I/O control unit. Thus, it is possible to execute in parallel both data transfer and start process of different magnetic tape units, so that the throughput of the whole system is improved. The above concept has been applied to such devices as magnetic disk units.

According to Japanese patent application No. 59-10074 filed in the name of the same assignee as the present application (corresponding to U.S. Pat. No. 4,754,399 "Input Output Control", issued Jun. 28, 1988), if a data transfer path is unoccupied, a start request is issued to the I/O device to or from which data transfer is desired. At the end of the start process, the I/O control unit is reconnected. If at the end of the start process, another I/O device is under data transfer and the data transfer path is occupied, then it is necessary for the I/O device to follow a stop/rewind/restart process. Thus, this I/O control system is not always efficient.

Japanese Patent Unexamined Publication No. 57-159324, (corresponding with U.S. Pat. No. 4,423,480), relates to a system in which an exclusive path for a control signal transfer is provided, through which a start request is issued to an I/O device while another I/O device is under data transfer. Described therein is an operation in which the time required for starting and for data transfer to or from an I/O device are equal. In this case, for example, if a data transfer of an I/O device A starts at a time when a start request is issued to another I/O device B, then the start process of the I/O device B completes just when the data transfer of the I/O device A terminates. However, in general, it is common that the data transfer rate and the time required for starting an I/O device differ from each other. Thus, it is impossible for I/O devices to incessantly use the data transfer path. An effective use of the data transfer path has not been possible in the conventional I/O control system.

SUMMARY OF THE INVENTION

It is an object of the present invention to solve the above-mentioned prior art problems and provide an I/O control system and method capable of efficiently using the data transfer path between I/O devices and an I/O control unit, while off-line processing a start process prior to a data transfer process.

It is another object of the present invention to provide an I/O control system and method wherein a data transfer path between I/O devices and an I/O control unit, from which a start process prior to a data transfer process is off-line processed, is efficiently used by making an incessant data transfer possible, and wherein data preloading and batchwriting is realized with a minimum buffer size.

It is a further object of the present invention to provide an I/O control unit capable of improving the utilization of a data transfer path.

To achieve the above objects, the I/O control system according to one aspect of the present invention comprises an I/O control unit, a plurality of I/O devices whose start process prior to a data transfer process is off-line processed from the I/O control unit, and a data transfer path for performing a data transfer with one of the I/O devices which data transfer is performed for one I/O device at a time wherein the I/O control system is characterized in that an I/O device is controlled to complete a start process at a time when a data transfer of another I/O device is completed.

According to another aspect of the present invention, the data transfer control system is characterized in that data transfers for first and second I/O devices are sequentially performed, a start time for a third I/O device is calculated during a period between said data transfers, and a calculated time is supplied to a timer provided on said third I/O device. By making such control, data transfer is sequentially performed and utilization of the data transfer path is improved. Furthermore, preloading and batchwriting control is effected to improve the utilization of the data transfer path.

BRIEF DESCRIPTION OF THE DRAWINGS

FIG. 4 is a detailed illustration of the MT management information unit of FIG. 2;

FIG. 5 is a flow chart showing the processing of the I/O control unit shown in the embodiment of FIG. 1;

FIG. 11 is a detailed illustration of the I/O control unit of FIG. 10;

FIG. 12 shows the contents of the MT management information unit of the I/O control unit;

DESCRIPTION OF THE PREFERRED EMBODIMENTS

Figure 1:
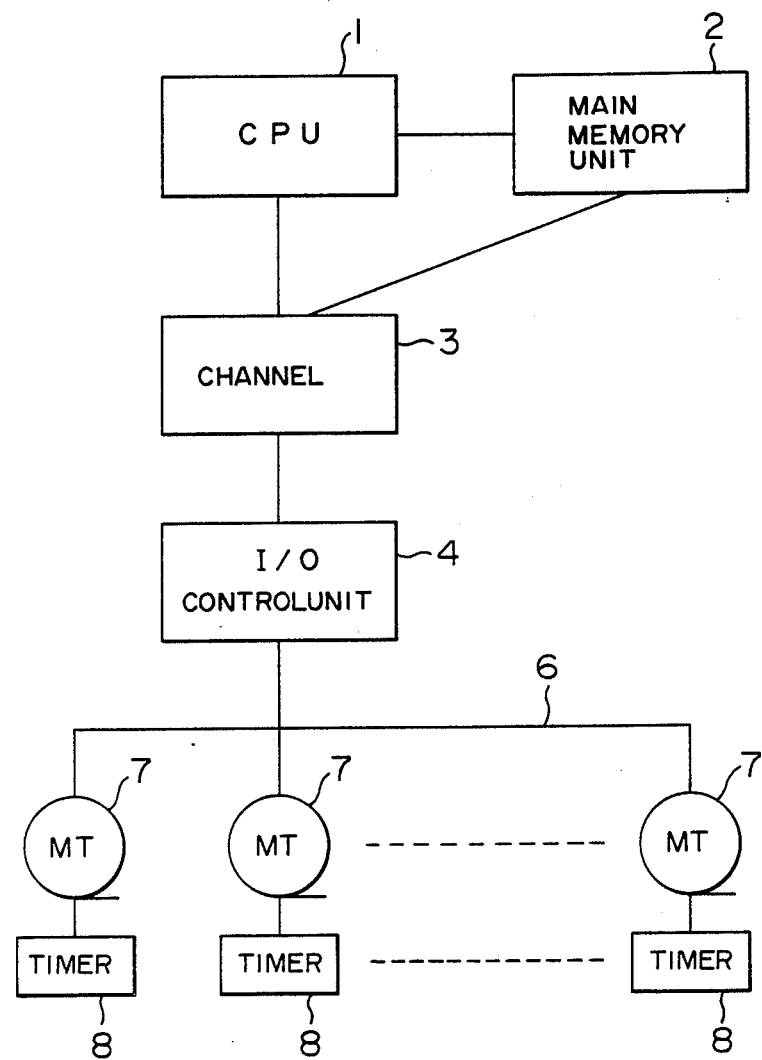
FIG. 1 is an overall block diagram showing an embodiment of an I/O control system according to the present invention.

The principle and embodiments of the present invention will be described in detail with reference to the accompanying drawings.

In the case of disk units, it is relatively difficult to control a start time of data transfer since the disk in a disk unit always keeps rotating. While on the other hand, in case of a start process of a magnetic tape unit, it is relatively easy to control a start time of data transfer since the time required for the start process from a stop state to a constant speed state is generally constant.

Furthermore, since the data transfer rate of an I/O device has a deterministic distribution and the amount of data transfer is generally known beforehand, it is possible to estimate the time of completion of data transfer. Therefore, it is possible to control the start time of an I/O device so that the I/O device can start data transfer just when another I/O device under data transfer completes the data transfer. Thus, an efficient use of a data transfer path is possible.

The above operation will be more precisely described hereinbelow. It is assumed here that an I/O device or a cartridge type magnetic tape unit without a vacuum column has the following characteristics: (a) The data transfer start time can be controlled; and (b) The start time of a start process can be calculated from the data transfer start time (it is essential to know the time required for the start process before starting the start process).

The above performance is possible in practice since the time required for the start process for a cartridge type magnetic tape unit is generally fixed. Even if the time required for the start process differs for each unit, the present invention is also applicable to such a case on condition that the time required for the start process can be known before starting the start process. However, to simplify the description, it is assumed that the time required for the start process is the same for each I/O device. In general, the data transfer rate of an I/O device has a deterministic distribution, and the amount of transfer data is known at the time when data transfer starts. Thus, the time when an I/O device completes its data transfer can be calculated beforehand. As a result, an I/O device having the above two characteristics can be controlled to start its start process in such a way that its data transfer starts at the time when another I/O device completes its data transfer.

A cartridge type magnetic tape unit not provided with a vacuum column is here abbreviated as merely an MT. Taking T as a time when a data transfer path becomes unoccupied after a data transfer is completed, and taking t as the time required for a start process of an MT, it is necessary to start a start process at time (T - t) in order to start a data transfer of the MT at time T. However, if the data transfer path is occupied at time (T - t) by another MT under data transfer, then a start request cannot be issued through this data transfer path, unless another path is additionally provided. Therefore, in this embodiment, an I/O device is provided with a timer which issues, while the data transfer path is unoccupied, a start request that a start process be started at a time after a certain time lapse from now. Thus, at time (T - t) a start process can be initiated.

FIG. 1 is a block diagram showing an embodiment of the I/O control system according to the present invention.

Reference numeral 1 represents a CPU, 2 is for a main memory unit, 3 for a channel, 4 for an I/O control unit, 6 for a data transfer path, 7 for an MT, and 8 for a timer.

An MT or a magnetic tape without a vacuum column has a longer start process time so that data of a plurality of blocks are preloaded or batchwritten in one I/O process. To this end, it is common for the I/O control unit to include therein a buffer to store preloaded data or temporarily store received data from the channel 3. The start control system of this invention is useful without regard to the presence or absence of a buffer. Therefore, a description will first be given for the case where a buffer is not used and preloading and batchwriting is not conducted. The case where a buffer is used and preloading and batchwriting is conducted will be later described.

Figure 2:
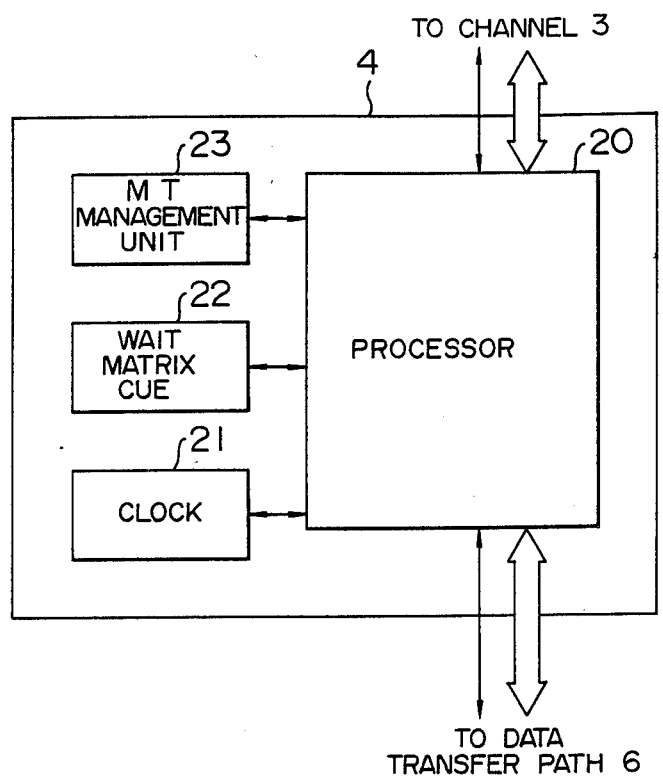
FIG. 2 is a detailed illustration of the I/O control unit of FIG. 1.
Figure 3:
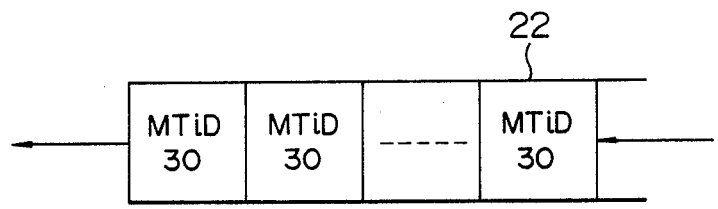
FIG. 3 shows the arrangement of the wait queue of FIG. 2.

FIG. 2 is the detailed construction of the I/O control unit of FIG. 1. FIG. 3 shows the construction of the wait queue. FIG. 4 shows the construction of the MT management information unit of FIG. 2.

As shown in FIG. 2, the I/O control unit 4 is constructed of a processor 20 for performing a data transfer process and a control process for an MT start, stop, rewind and so on; a clock 21 indicating the current time; a wait queue 22; and an MT management information unit 23. In the wait queue 22 as shown in FIG. 3, MT identifiers 30 (MTiD) for identifying an MT which received a start request, are disposed. The processor 20 executes an I/O process for an MT, sequentially starting from that MT corresponding to the left side MTiD. As shown in FIG. 4, the MT management information unit 23 stores information on a data transfer path empty (or unoccupied) time 40; an MT data transfer rate 41; an MT start time 42; and an MT block length 43. Each MT 7 has a set of these informations. The data transfer path empty time 40 indicates a time at which the data transfer path 6 becomes empty or unoccupied. The MT data transfer rate 41 and MT start time 42 respectively indicate an MT transfer rate and MT start time. Assuming that each of these pieces of information is the same for all MTs, a single set of each information is depicted in FIG. 4. The MT block length 43 is generally variable. However, assuming a fixed length of MT, a fixed MT block length 43 has been used as in FIG. 4.

When data is of a variable length type, it is generally impossible to calculate the data transfer time in advance. However, in such case, a predicted data transfer time based on statistical information can be used. Further, when preloading and batchwriting are to be performed utilizing a buffer provided in the control unit, the data transfer time for batchwriting can be calculated because data to be batchwritten is already present in the buffer. The data transfer time for preloading in this case, however, has to be a predicted value.

The data transfer path 6 is used not only in data transfer but also in issuing a start request. In issuing a start request, information on how many unit times a start process must wait before being initiated, is also transferred. An MT 7 does not have vacuum column, and the time required for the start process is long, so that the start process is off-line processed from the I/O control unit 4. After a start process is completed and a constant running speed of an MT 7 is attained to enable a data transfer, the MT 7 is reconnected to the I/O control unit 4.

FIG. 5 is a flow chart showing an example of the processes to be executed by the processor of the I/O control unit according to the present invention.

The processor 20 starts to execute a data transfer process, either when an I/O request from the channel 3 is received (step 101) or when a notice of start completion of any one of MTs is received (step 100). First, when a start completion notice of an MT 7 is received, then a predetermined procedure with the channel 3 is performed (step 102) to thereafter follow a data transfer (step 103). Upon completion of a data transfer, the lead MTiD 30 of the wait queue 22 is removed (step 104). Next, it is determined whether another start completion notice is present or not (step 100).

Next, if the processor receives an I/O request from the channel 3, it issues a start request to an MT (step 106). Since it is necessary to instruct the number of unit times which must elapse before the start process is initiated, the processor 20 calculates a start time prior to the above issuance (step 105). Next, after updating a data transfer path empty time (step 107), step 100 resumes.

The start time is calculated in the following way:

First, S, defined by the following equation, is determined.

$$S = \text{(data transfer path empty time 40)} - \text{(the current time obtained from the clock 21)} - \text{(the time required for the start process of an MT)} \quad (1)$$

If S is zero or smaller, a start request is issued to the corresponding MT 7 so as to immediately initiate a start process. If not, a request to initiate a start process after S is issued to thereafter set the timer of the corresponding MT 7 (step 105 performs the processes up to this).

Updating of the data transfer path empty time 40 is carried out in the following manner:

This is the case where an MT issuing a start request for a start process further reserves the data transfer path 6. The transfer time of the MT 7 can be calculated by dividing the MT block length 43 by the MT transfer rate 41. Taking the calculated value as u, then the data transfer path 6 is occupied for the time obtained by adding an overhead time V to u. Therefore, if S is larger than 0, the data transfer path empty time is updated by the following equation.

$$\text{(Data transfer path empty time 40)} \leftarrow \text{(Data path empty time 40)} + u + V \quad (2)$$

If S is 0 or smaller, immediately a start process for an MT is initiated, so that the data transfer pass empty time is updated by the following equation.

$$\text{(Data transfer path empty time 40)} \leftarrow \text{(the present time obtained by the clock 21)} + \text{(the time 42 required for a start process of an MT)} + u + V \quad (3)$$

Thereafter, an identifier MTiD 30 of the MT 7 is registered at the last of the wait queue 8-22 (step 107 performs the processes up to this). Thereafter step 100 resumes.

According to the conventional system as described previously, the I/O devices are subjected to parallel start processing, and a data transfer is performed with the I/O device which has first become usable for data transfer. However, in case an I/O device is under data transfer when another I/O device becomes usable, the latter device cannot be used and must be again subjected to a start process at a later time. Thus, the utilization of the data transfer path is very poor. While on the other hand, in the present embodiment, the use efficiency of the data transfer path is very high, thereby resulting in an improvement of the performance.

Figure 6:
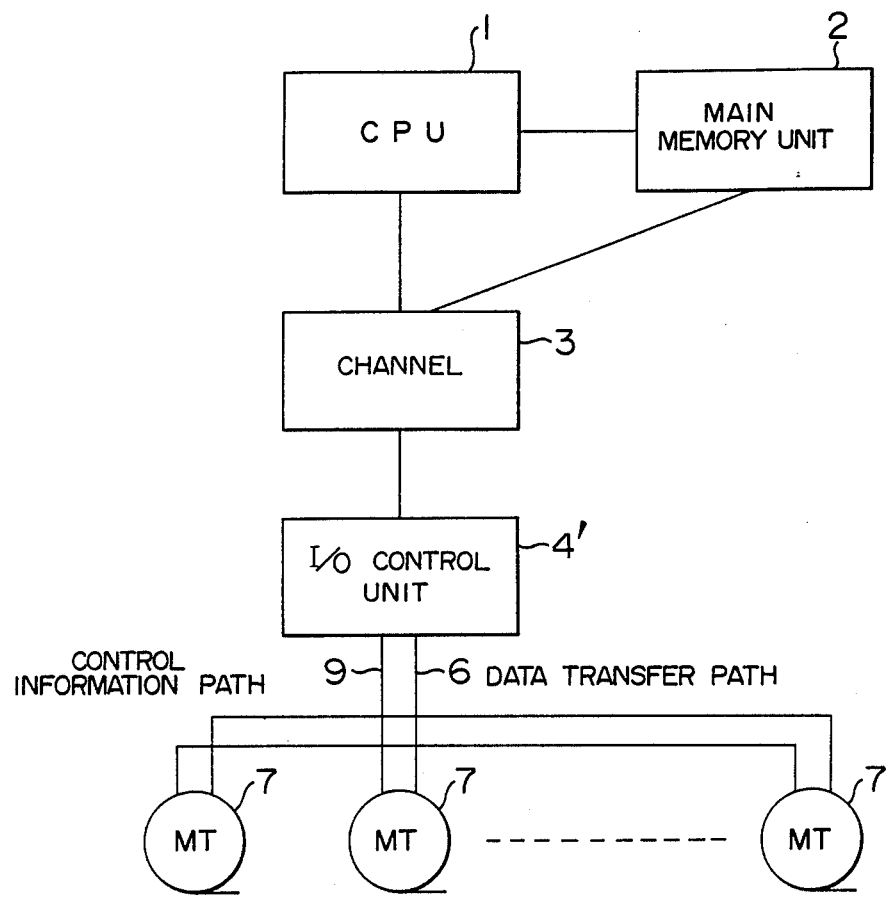
FIG. 6 is an overall block diagram showing another embodiment of an I/O control system according to the present invention.

FIG. 6 is a block diagram of another embodiment of the I/O control system according to the present invention. Elements similar to those in FIG. 1 have been designated using identical reference numerals, and the description therefor is omitted.

In FIG. 6, the I/O control system is almost the same as FIG. 1 except that a control information path 9, in addition to data transfer path 6, is provided, and that the timer 7 is not needed. Also, since the internal arrangement of an I/O control unit differs from that of FIG. 1, reference numeral 4' has been used.

Figure 7:
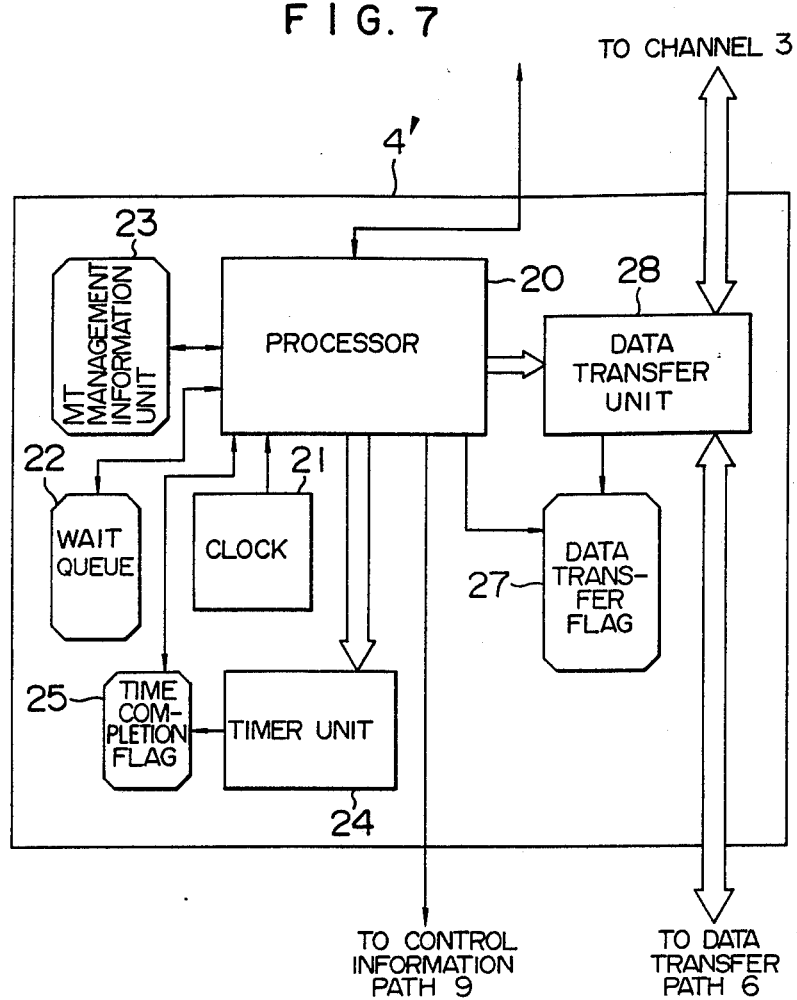
FIG. 7 is a detailed illustration of the I/O control unit of FIG. 6.

FIG. 7 shows the internal arrangement of the I/O control unit 4' of FIG. 6. The I/O control unit 4' is constructed of: a processor 20 for the controlling data transfer process and the like; a data transfer unit 28 for conducting data transfer between a channel 3 and one MT 7 among the MTs; a clock 21 indicating the current time; a timer completion flag 25; a timer unit 24 for setting the timer completion flag 25 to ON after a designated time unit; a wait queue 22 for queueing input/output requests; an MT management information unit 23; and a data transfer flag 27 indicating that the data transfer unit 28 is under transfer operation. The data transfer unit 28 sets the data transfer flag 27 to OFF after completion of data transfer.

Figure 8:
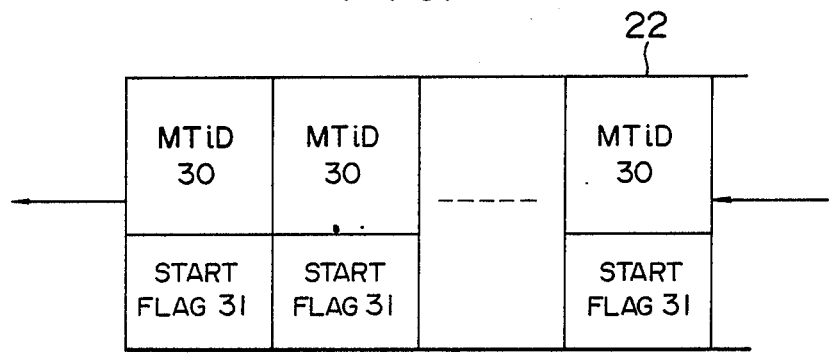
FIG. 8 shows the arrangement of the wait queue of FIG. 7.

FIG. 8 shows the construction of the wait queue 22 of FIG. 7.

The wait queue 22 stores an identifier MTiD 30, for identifying an MT 7 among the MTs, and a flag 31, indicating whether the start process for the MT 7 is now being performed or is still not performed (the MT 7 is under the start process while the flag is set to ON, and still not under the start process while the flag is set to OFF).

The internal construction of the MT management information unit 23 of FIG. 7 is the same as that of FIG. 4. Stored in the MT management information unit 23 are: a data transfer path empty time 40 representing the time when the data transfer path 6 becomes unoccupied; an MT transfer rate 41; a time required for the start process 42 and an MT block length 43. The data transfer path 6 and control information path 9 can concurrently perform a transfer for only one MT among the MTs. However, the time necessary for sending the control information is very short and accordingly negligible. Since an MT 7 has no vacuum column, its start process time is large. Thus, the start process of an MT 7 is off-line processed relative to the I/O control unit 4'. After completion of the start process and after the running speed of MT 7 becomes constant and a data transfer becomes possible, then the I/O control unit 4' is reconnected.

Figure 9:
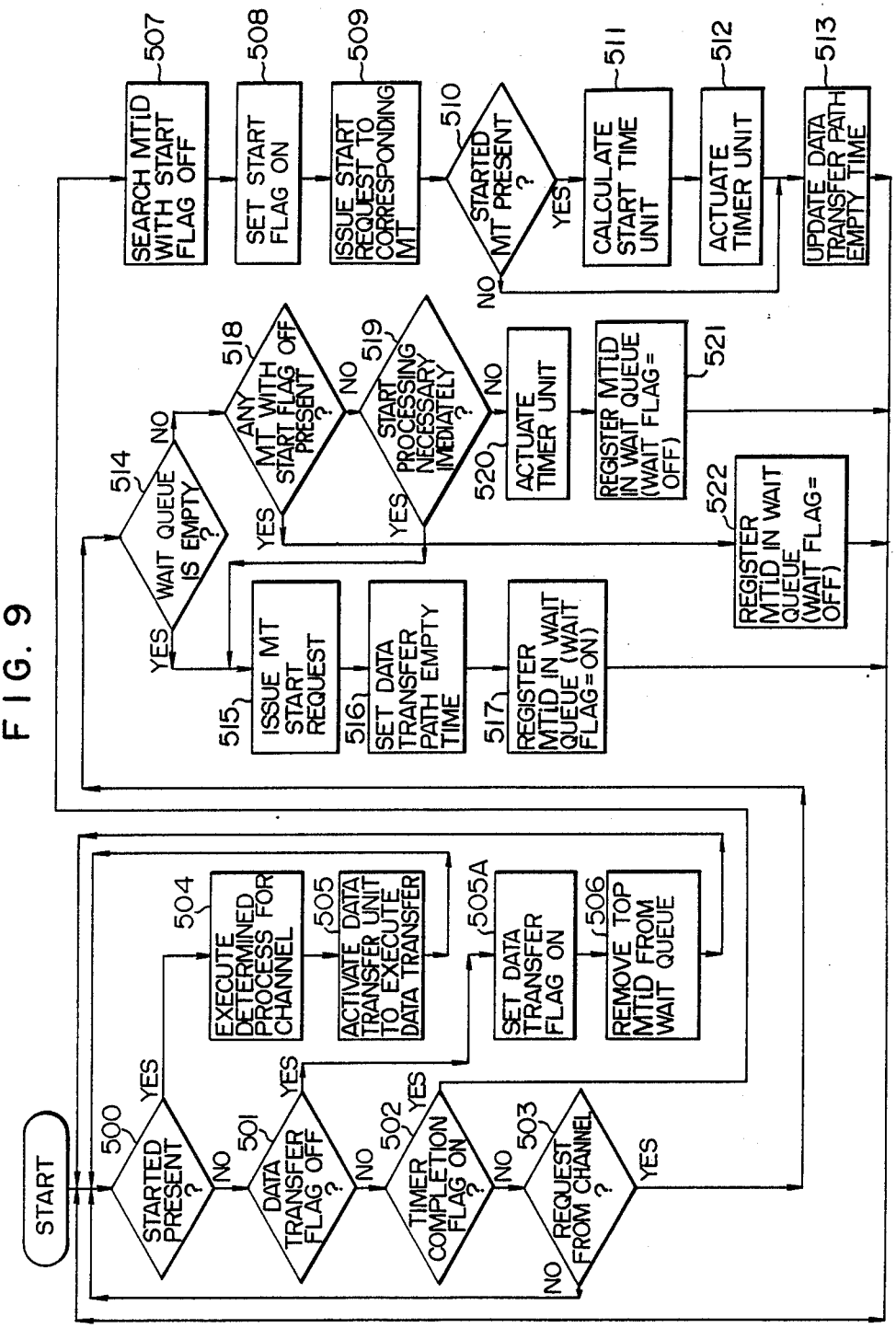
FIG. 9 is a flow chart showing the processing of the I/O control unit of FIG. 6.

FIG. 9 is a flow chart showing the processes of the processor 20 of I/O control unit of FIG. 7.

The processor 20 starts its processing: either when a start process for any one MT 7 is completed (step 500); when a data transfer is completed (i.e., when the data transfer flag 27 is set to OFF, step 501); when the timer completion flag 25 is set to ON (step 502); or when an input/output request is received from the channel 3 (step 503). As seen from the flow chart, the most preferential step is to determine whether the start process of an MT 7 is completed or not (i.e., step 500). The processes to be performed in each case will be described hereinunder.

If a start process for any one MT 7 among the MTs is completed, a data transfer process between the MT 7 and the channel 3 will proceed. In particular, after the processor 20 performs a predetermined procedure for the channel 3 and I/O control unit (step 504), the data transfer unit 28 is initiated to execute a data transfer process (step 505).

Next, after completion of the data transfer process, i.e., after the data transfer flag 27 is set to OFF, then the data transfer flag 27 is set to ON (step 505A) to remove the head MTiD 30 from the wait queue 22 (step 506).

Next, if the timer completion flag 25 is set ON, it is necessary to issue a start process request to any one MT 7 among the MTs. In particular, the start flag 31 is checked starting from the head of the wait queue 22. When the first start flag 31 which is set to OFF is found, the corresponding MTiD 30 identifies the MT 7 to be subjected to start process. That is, the MTiD whose start flag 31 is set to OFF is searched (step 507), and the start flag 31 is then set to ON (step 508). A start request is issued to the corresponding MT 7 via the control information path 9 (step 509). Next, the start flags are searched from the head of the wait queue 22 in order to find the start flag which is set to OFF. If not found, the flow jumps to step 513 (step 510). If found, it is necessary to prepare the start process for the corresponding MTiD. First, it is determined when the start process is initiated (step 511). The time S can be calculated by the following equation;

$$S = \text{(data transfer path empty time 40)} - \text{(the time required for MT start process 42)} \quad (4)$$

Thereafter, the timer unit 24 is actuated (step 512) in such a way that the timer unit 24 sets the timer completion flag 25 to ON after a lapse of a preset time S' from the current time. The preset time S' is calculated as follows:

$$S' = S - \text{(the current time obtained from the clock 21)} \quad (5)$$

Further, it becomes necessary to update the data path empty time 40 (step 513). This is because the MT 7 among those MTs that have already performed a start process has reserved the data transfer path 6. The data transfer time of the MT 7 can be calculated by dividing the corresponding MT block length 43 by the MT transfer rate 41. This data transfer time is represented by u. In practice, the data transfer path 6 is occupied for the time u plus an overhead time V. Therefore, the data transfer path empty time 40 is updated as follows:

$$\text{(data transfer path empty time 40)} \leftarrow \text{(data transfer path empty time 40)} + u + V \quad (6)$$

Thereafter, the flow returns to step 500.

Lastly, the case where an input/output request from the channel 3 is received (step 503) will be described.

First, it is determined whether the wait queue 22 is empty or not (step 514). If not empty, the flow jumps to step 518. If empty, a start request for the MT is issued (step 515). After issuance of the start request, the data transfer path empty time 40 is set (step 516). The data transfer path empty time is determined as in the following.

$$\text{(data transfer path empty time 40)} \leftarrow \text{(the current time obtained from the clock 21)} + \quad (7)$$

-continued
$$\text{(the time required for an MT start process)} + u + V$$

The same definition as described previously is applied to u and V.

After setting the data transfer path empty time 40, the corresponding identifier MTiD 30 of the MT 7 is set at the wait queue 22 (step 517). Thereafter, step 500 resumes.

If the wait queue 22 is not empty, the MT 7 whose start flag 31 is set to OFF is searched starting from the head of the wait queue 22 (step 518). If found, the flow jumps to step 522. If not found, it is necessary to judge if the start process for the MT 7 is immediately performed (step 519), or if the timer unit is actuated and after a preset time a start process is to be performed (step 520). This judgement is dependent upon the data transfer path empty time 40. In particular, in case the time when the start process is completed after the immediate start of the start process, is later than the data transfer path empty time, then it is necessary to start the start process at once. Contrary, if not such a case, then it is necessary to delay the start time such that the start process is completed just at the data transfer path empty time 40. The judgement at step 519 is made specifically in the following way:

$$S = \text{(data transfer path empty time 40)} - \quad (8)$$
$$\text{(the current time obtained from the clock 21)} -$$
$$\text{(the time required for an MT start process 42)}$$

If S is zero or smaller, a start process is immediately performed to accordingly jump to step 515. If S is larger than zero, a start request should be issued after S time later from the current time. To this end, the timer unit 24 is requested to set the timer completion flag 25 to OFF after t time has elapsed (step 520). Next, the identifier MTiD 30 of the corresponding MT 7 is added to the last of the wait queue 22 (step 521). At this time, the start flag 31 is set to OFF. Thereafter, step 500 resumes.

In the foregoing, two embodiments of the present invention have been explained. In this explanation, the processing flow of the processor 20 is described on the assumption that in either embodiment, the start process of the MT 7 can be initiated at the start time calculated by the processor 20. However, in reality, as will be explained later in connection with a further embodiment, there is a possibility that a repositioning operation of the MT 7, after having transferred data, is under way at the calculated start time point. It should be noted however that such problem can be resolved, as will be explained later with reference to a further embodiment, by having the processor 20 identify the MTs 7 which are under repositioning and inhibit the start request from being issued to the identified MTs.

If the wait queue 22 already has an MTiD 30 whose start flag is set to OFF, then the timer unit 24 is already actuated for the corresponding MT 7. Therefore, the identifier MTiD 30 of the MT 7 with an input/output request received is added to the last of the wait queue 22 (step 522). Thereafter, step 500 resumes.

As seen from the above embodiment, the data transfer time has a deterministic distribution, the amount of data transferred is known, and the data transfer completion time is predictable. Based upon these facts and by providing a path for exclusive use for issuance of a start request, it is possible to control the start time of an I/O device such that it completes its start process just at the time when another I/O input device terminates its data transfer operation. Therefore, an efficient data transfer is possible.

As seen from the foregoing description of the embodiment, for an I/O device whose start process prior to a data transfer process is achieved through an off-line processing, it is possible to efficiently use the data transfer path, thereby enabling an efficient data transfer.

Next, another embodiment provided with a buffer for executing preloading and batchwriting will be described.

Figure 10:
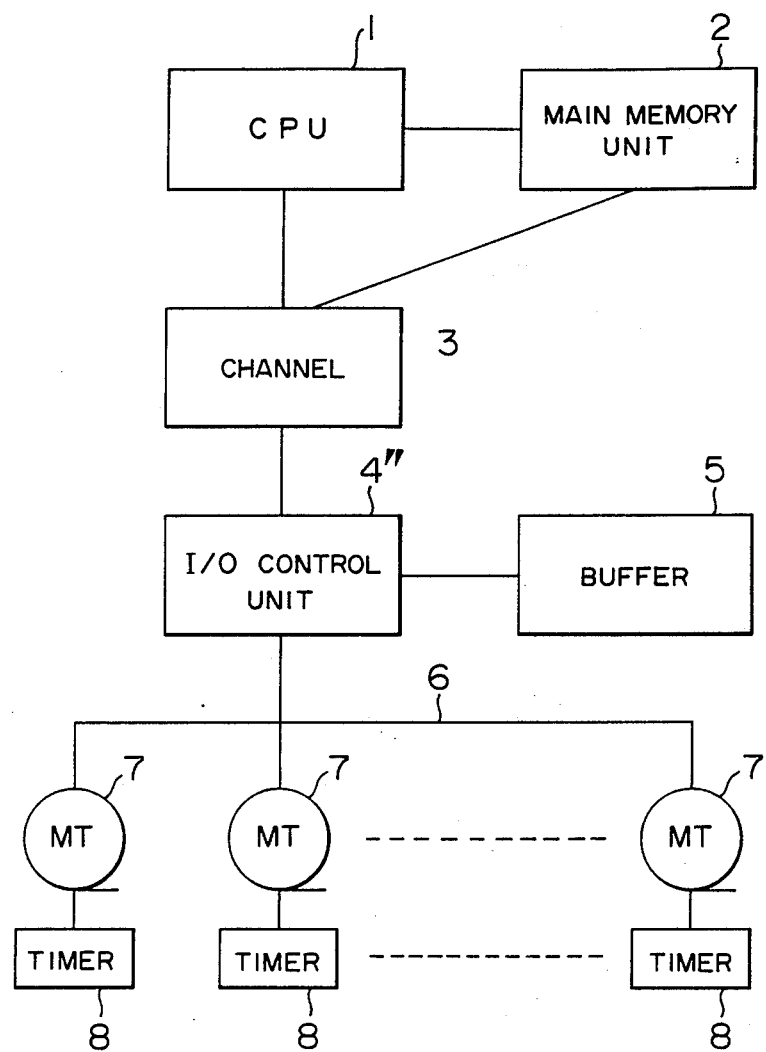
FIG. 10 is a block diagram showing a further embodiment of the I/O control system according to the present invention.

FIG. 10 shows a hardware construction of the I/O system capable of executing preloading and batchwriting according to the present invention. Elements similar to those in FIG. 1 have been represented by the same reference numerals.

The I/O system is constructed of: the CPU 1 for controlling various units; the main memory unit 2 for storing system data; the channel 3 coupled to CPU 1 and the main memory unit 2; an I/O control unit 4″ for controlling information of lower hierarchic units; a buffer 5 for temporarily storing preloading and batchwriting data; the data transfer path 6 for use in transfer of various data; the MT 7 for storing data; and the timers 8 connected to respective MTs. A tape of a cartridge type MT unit cannot be stopped at once. Therefore, it takes several times as long as the time required for a start process for the tape to be re-positioned after a data transfer. It is therefore required to preload and batch-write data in order to avoid degrading the efficient use of the data transfer path 6 due to such a long re-position time. To temporarily store the data, the buffer 5 is connected to the I/O control unit 4″. Furthermore, similar to the embodiment of FIG. 1, to avoid degrading the utilization of the data transfer path, it is also necessary to adopt a control method capable for starting a data transfer of one MT immediately after another MT completed its data transfer. To this end, it is necessary to issue a start process request in such a way that when the preceding MT completes its data transfer, the following MT completes its start process. However, if the data transfer is performed via the data transfer path 6, then a start process request cannot be sent to another MT. In view of this, a request for performing a start process several time units later is previously issued while the data transfer path 6 is unoccupied. To conduct such control, a timer 8 is provided for each MT, similar to the embodiment of FIG. 1.

FIG. 11 is a detailed construction of the I/O control unit 4″ of FIG. 10.

The I/O control unit 4″ is constructed of: a processor 10 for controlling data transfer between the channel 3 and buffer 5; processor 11 for controlling a data transfer between the buffer 5 and MTs 7; an MT management information unit 12 and a buffer management information unit 13 respectively storing information for controlling both processors 10 and 11; and a clock 14. As described previously, an I/O device such as a cartridge type MT device is impossible to start at a high speed. In addition, even after a data transfer, it takes several times as long as the time required for the start process for preparation of the next start process (i.e., stop and rewind of the tape after a data transfer). Therefore, if the units of data being transferred are small, there is a high probability that all MTs are performing start processes or the preparations for the start process. Thus, the efficient use of the data transfer path 6 not accomplished.

In view of this, it is intended to improve the system throughput by preloading and batchwriting data between the MTs 7 and the buffer 6, and by operating, in parallel, the processor 11 for controlling preloading and batchwriting and the processor 10 for controlling data transfer between the channel 3 and the buffer 5.

Figure 13:
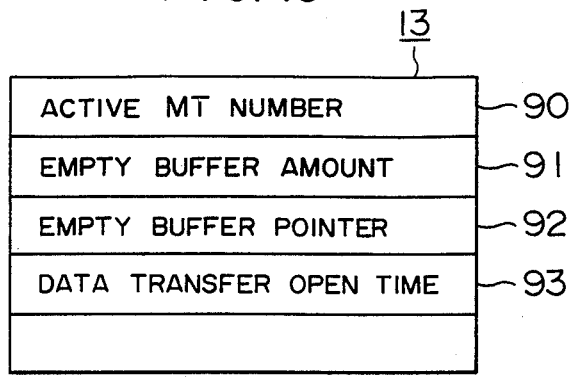
FIG. 13 shows the contents of the buffer management information unit of the I/O control unit.

FIG. 12 shows the contents of the MT management information unit 12, and FIG. 13 shows the contents of the buffer management information unit 13.

First, the MT management information unit 12 provided for each MT will be described. MTiD 80 indicates which MT the information belongs to. An MT status 81 indicates whether the status of the MT is a non-active state, a mount state, an execution state, or a rewind state. A read/write status 82 indicates whether the MT is in a read state or in a write state. A data amount 83 indicates the amount of data of the MT. A buffer address 84 indicates the address of the lead data of the MT. In addition, the MT management information unit 12 is provided with a start flag 85 indicating whether the MT is performing a start process; an operation flag 86 indicating whether the MT is under operation; a preloading and batchwriting completion flag 87 indicating the completion of preloading and batchwriting; a wait flag 88 which is set to OFF to make the process request from the channel wait; and a temporary flag 89.

Next, the buffer management information unit 13 will be described. The buffer management information unit 13 is constructed of: the number of active MTs 90 indicating the dynamically changing number of MTs; an empty buffer amount 91 indicating the amount of empty buffers; an empty buffer pointer 92 indicating the top address of the empty buffers; and a data transfer empty time 93 indicating the time when the data transfer path 6 becomes empty or unoccupied.

Figure 14:
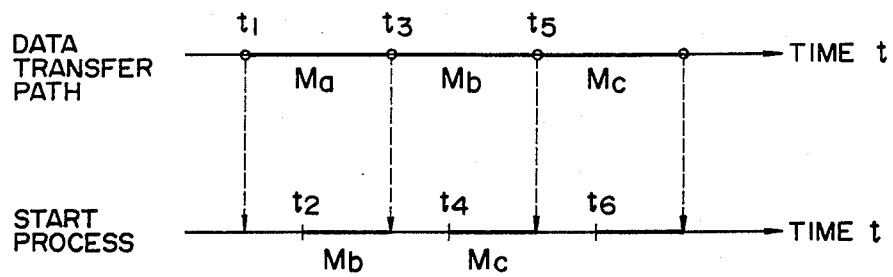
FIGS. 14 and 15 are timing charts showing examples of operations in the data transfer control system of the present invention.
Figure 15:
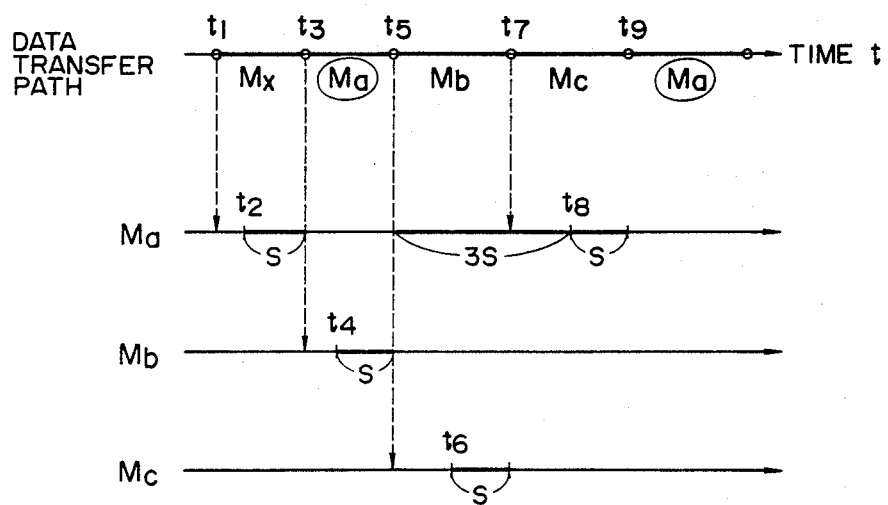
Figure 16:
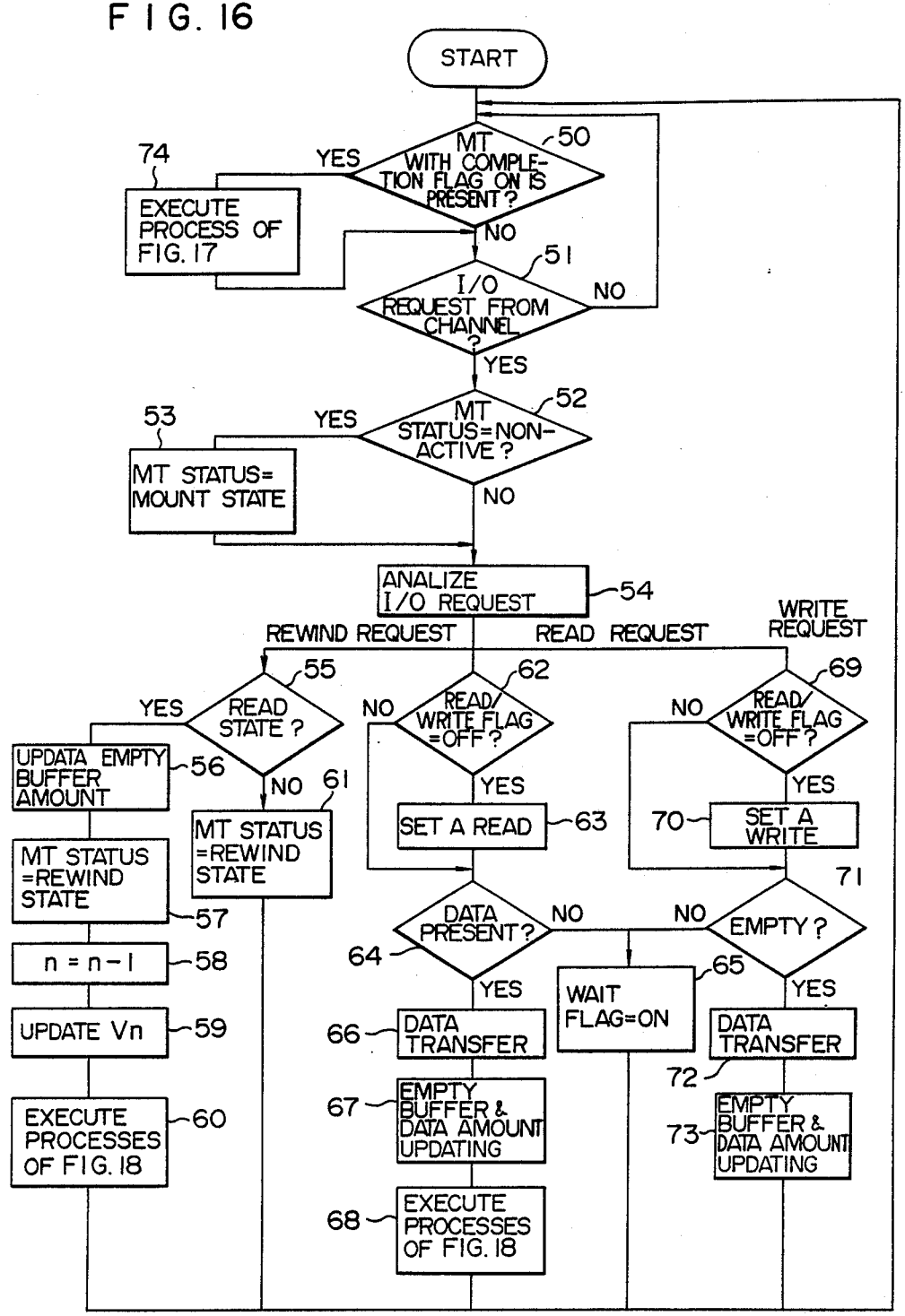
FIGS. 16 to 21 are flow charts illustrating the operation of the present invention.

FIGS. 14 and 15 are timing charts specifically illustrating the operations of the data transfer control system according to the embodiment.

Next, the data transfer control system using the above-described I/O control unit 4″ will be described. Since the cartridge type MT device is not provided with a vacuum column, it cannot perform a high speed start process. Therefore, the start process is conducted through an off-line processing relative to the I/O control unit 4″. Such off-line processing, similar to a disk unit, may result in a premature try (an operation wherein after a start process for an MT, the data transfer path is in use with another MT so that it cannot be connected to the I/O control unit 4″), and in an inefficient use of the data transfer path 6. Different from a disk unit, the time required for a start process for an MT (corresponding to seek and search operation of a disk) has a deterministic distribution. Therefore, it is possible to achieve an efficient use of the data transfer path 6 if an MT is controlled to start its start process in such a way that the data transfer starts just when another MT completes its data transfer (the time of completion of data transfer can be calculated beforehand if the amount of data to be transferred is known). Such control is similar to that described with FIG. 1. A particular control will be described with reference to FIG. 14. In the figure, two time axes are shown. The upper time axis is that of the MT by which the data transfer path 6 is occupied, while the lower time axis is that of the MT for the start process is to be performed. The two time axes are of the same scale. If the data transfer of an MT (Ma) is to be performed from time t1 to t3, then it is desirable to start the data transfer of another MT (Mb) at time t3. To this end, the start process for Mb must be started at time t2. However, since the data transfer of Ma is under operation at time t2, a start process request is not issued via the data transfer path 6. To solve this problem, the timer 8 is provided. In particular, a time period t2 - t1 is set to the timer 8 connected to Mb, at time t1 (a break between data transfers). The timer 8 starts counting from time t1, and after time period of t2 - t1 it sends a start process request to Mb. At a break between data transfers of first and second MTs, a start time of the start process for a third MT (Mc) is given to its timer 8. Such a control enables an efficient use of the data transfer path 6. In order to conduct such a control, it is necessary to know the time when the data transfer path becomes empty. This is notified by the data transfer empty time 93 in the buffer management information unit 13.

Apart from the start process, since a cartridge type MT unit has no vacuum column, the process to be performed after a data transfer takes several times as long as that required for the start process. The process includes a stop and rewind of the tape, and during this process the data transfer of the MT is impossible. Preventing the efficient use of the data transfer path 6 due to such process is avoided by the data transfer control system using preloading and batchwriting. Prior to the description of the control system, symbols used there are identified as follows:

s: the time required for an MT start process,
n: the number of active MTs,
t: an MT data transfer rate.

FIG. 15 shows the control timing chart where three MTs (Ma, Mb, Mc) are used. In FIG. 15, similarly to FIG. 14, four time axes are used. The uppermost time axis indicates the use state of the data transfer path 3, and the remaining three axes indicate the operations of respective MTs. While the data transfer of an MT (Mx) is performed during the time from t1 to t3, the data transfer of, for example, Ma is started from time t3. After completion of the data transfer of Ma at time t5, the following data transfer of Ma cannot be enabled for a time period of 4s (until time t9). In particular, this means that in re-starting a data transfer immediately after completion of the preceding data transfer, at least four times as long as the time (s) required for the start process is needed. The 4s time period includes: one s time required for completely stopping the tape after running at its predetermined speed; one s time required for accelerating the tape in opposite direction as that of the data transfer from its stop state and reaching the predetermined speed for tape rewinding; one s time required for again stopping the tape; and one s time required for again performing a start process for a data transfer. Therefore, it is possible to efficiently use the data transfer path 6 by conducting the data transfer (preloading and batchwriting) of the MTs (Mb, Mc) during such time period from t5 to t9. In view of the above, the amount of preloading and batchwriting is determined by the following equation:

$$Vn = 4 \cdot s \cdot t / (n-1) \quad (n \neq 1) \qquad (9)$$

Figure 17:
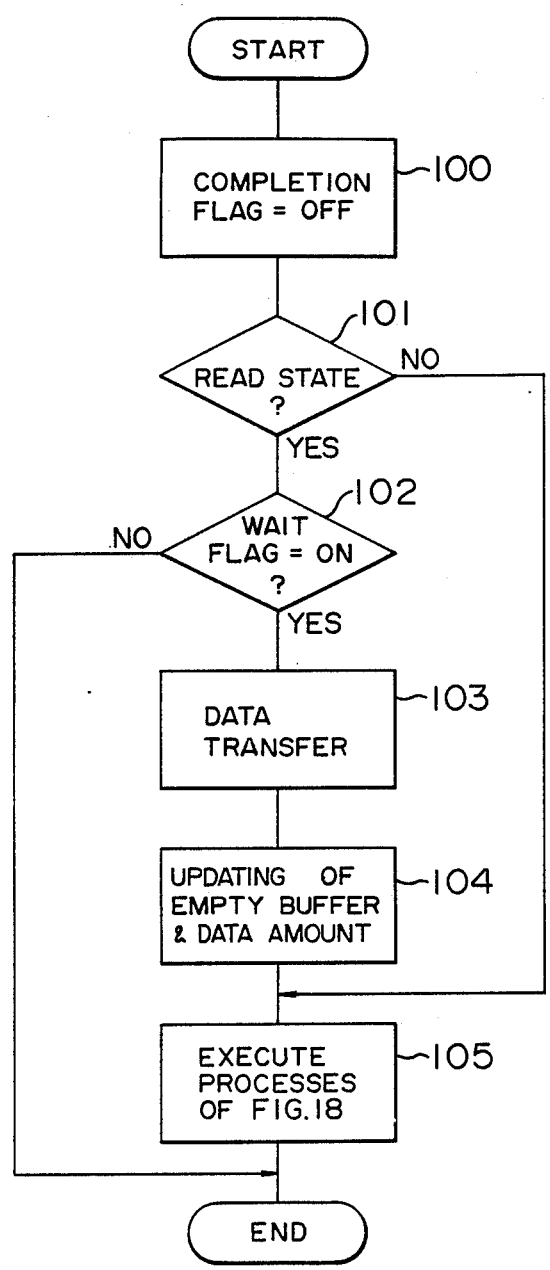

The flow charts for performing the above control by the processors 10 and 11 are shown in FIGS. 16 to 21. First, referring to FIG. 16, the flow chart of the processor 10 will be described. The processor 10 starts either when an MT exists whose preloading and batchwriting completion flag 87 is set to ON (step 50), or when an I/O request is received from the channel 3 (step 51). If there exists an MT whose preloading and batchwriting completion flag 87 is set to ON, the processes shown in FIG. 17 are carried out (step 74). If there is an I/O request from the channel 3, first it is determined whether the MT status 81 of the requested MT is in a non-active state (step 52). If in a non-active state, then the MT status 81 is made into a mount state (step 53). Thereafter, the I/O request is analyzed (step 54) to determine whether it is a rewind, read, or write request.

Figure 18:
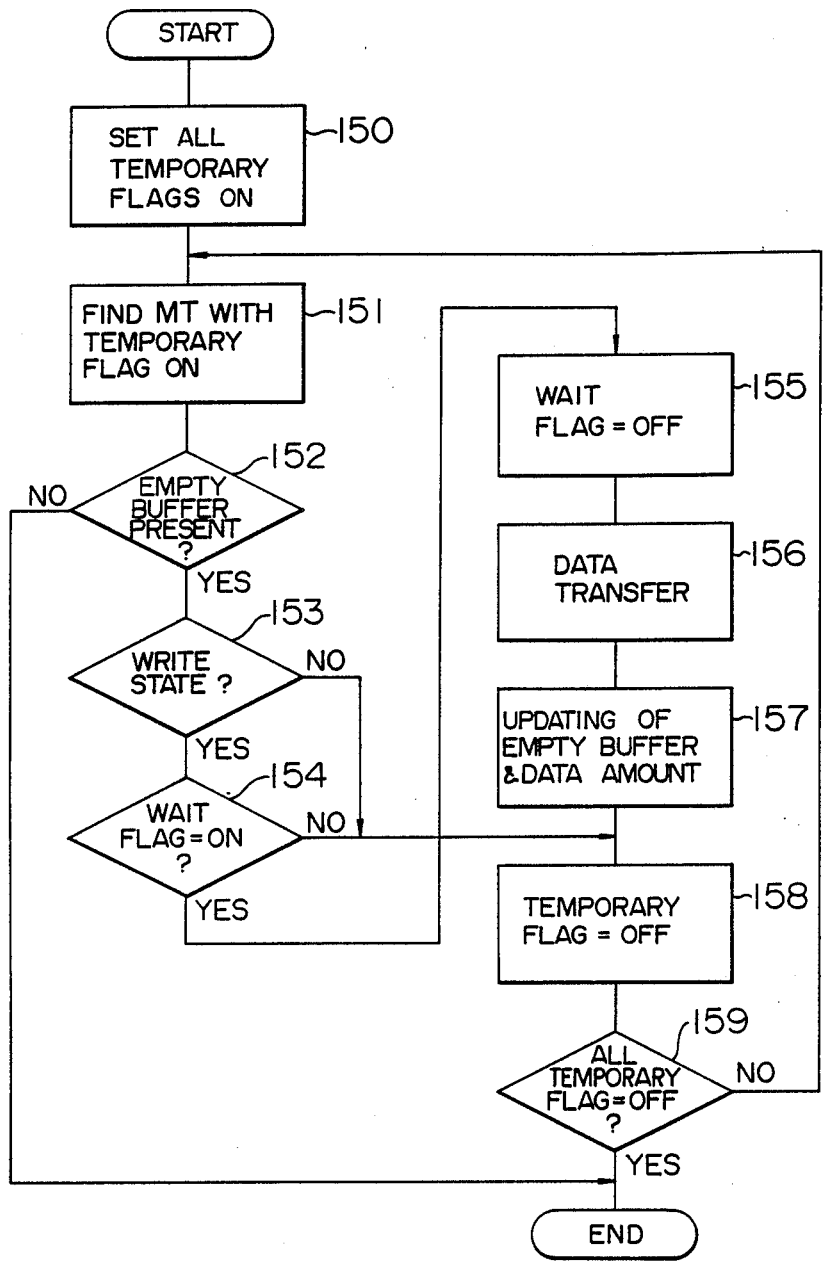

In case of a rewind request, it is determine whether the read/write status 82 is in a read state (step 55). If in a read state, the preloaded data in the buffer 5 is unnecessary, so that the amount of buffers the preloaded data occupies is added to the empty buffer amount 91 to renew the amount of empty buffers (step 56). Next, after making the MT status 81 into a rewind state (step 57), the number of active MTs is reduced by one (step 58). Simultaneously therewith, a new Vn is calculated by the equation (9) (step 59). Thereafter, the processes shown in FIG. 18 are carried out (step 60). The processes shown in FIG. 18 are those used in a write request where there is no empty buffer and the process is made to wait. If it is in a write state at step 55, then the MT status 81 is made in a rewind state (step 61).

Next, the processes will be described where the result of analyzing the I/O request at step 54 is a read request. First, it is determined whether the read/write status 82 is OFF or not (step 62). If OFF, the status is rendered in a read state (step 63). Next, it is determined whether the requested data is stored in the buffer 5 (step 64). If not, the wait flag 88 is set ON (step 65). If stored, the data is transferred (step 66), and the empty buffer amount 91 and data amount 83 are updated (step 67). Thereafter, the processes shown in FIG. 18 are carried out (step 68).

If the process request at step 54 is a write request, then a read/write status is determined (step 69). If the read/write flag is set to OFF, then it is changed to a write state (step 70). Next, it is determined whether there are empty buffers in the buffer 5 (step 71). If there is no empty buffer, the wait flag 88 is set to ON (step 65). If there are empty buffers, the data is transferred (step 72), and the empty buffer amount 91 and data amount 83 are updated (step 73).

FIG. 17 shows the control flow for the case where there exists at step 50 an MT whose preloading and batchwriting flag 87 is set to ON.

First, the preloading and batchwriting flag 87 is rendered OFF (step 100). It is determined whether the read/write status 82 is in a read state (step 101). If in a write state, then the flow jumps to step 105. If in a read state, it is further determined whether the wait flag 88 is set to ON (step 102). If OFF, the process is terminated. If ON, the data is transferred (step 103), and the empty buffer amount 91 and data amount 83 are updated (step 104).

FIG. 18 is a flow chart showing the process for a write request waiting for an empty buffer existing in the buffer 5. First, the temporary flags 89 of all MTs are set to ON (step 150). Next, the MT is searched whose temporary flag 89 is ON (step 151), and it is determined whether there is an empty buffer (step 152). If not, the process is terminated. If present, it is determined whether the read/write status 82 is in a write state (step 153). In a read state, the flow jumps to step 158. In a write state, the wait flag 88 is checked (step 154). If OFF, the flow jumps to step 158. If ON, the wait flag 88 is set to OFF (step 155). Succeedingly, the data is transferred (step 156), and the empty buffer amount 91 and data amount 83 are updated (step 157). Next, the temporary flag 89 is set to OFF (step 158). It is determined whether all temporary flag 89 are OFF (step 159). If all temporary flags are OFF, then the process is terminated, whereas if any one of the temporary flags is ON, then step 151 resumes.

Figure 19:
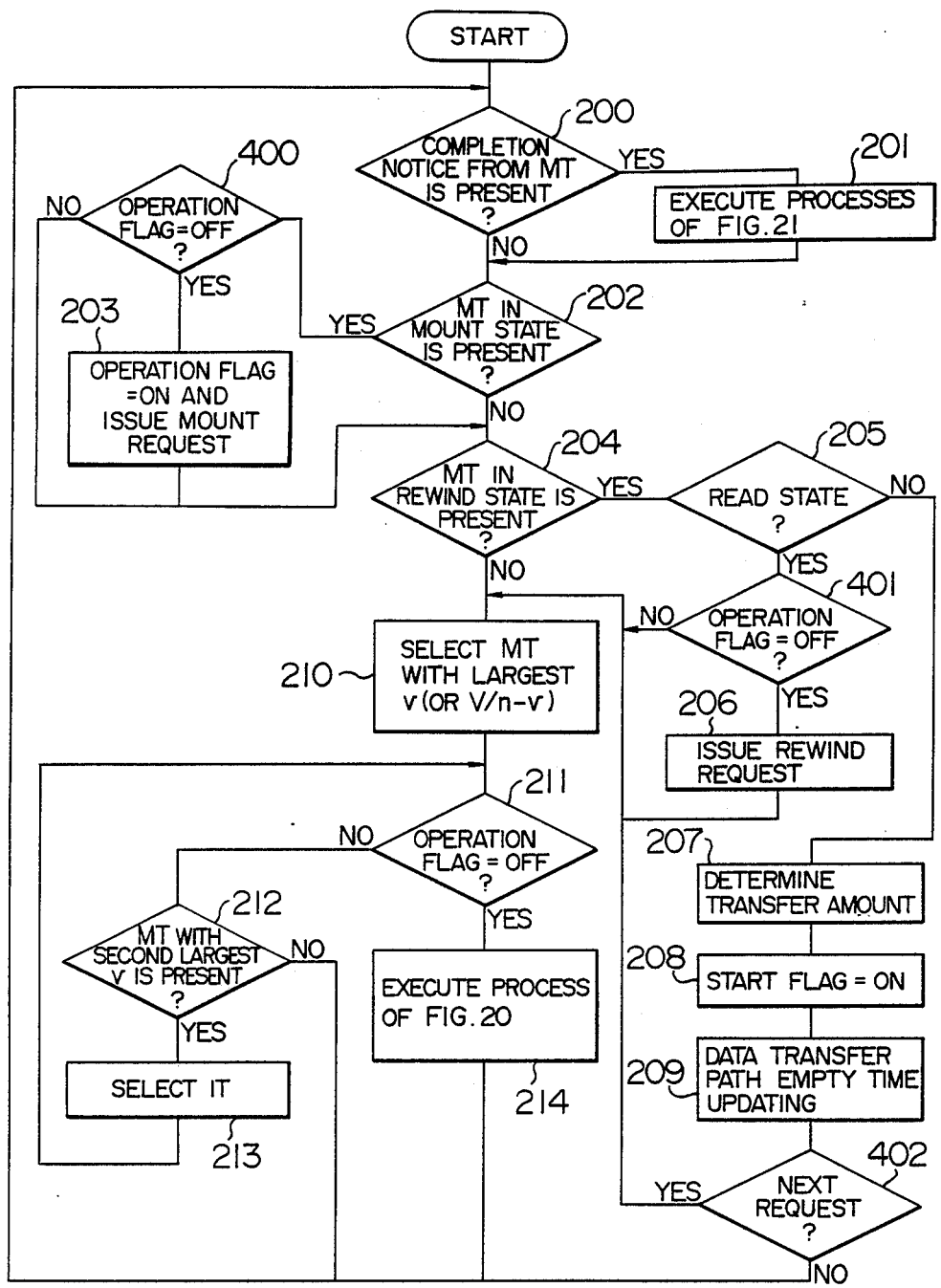
Figure 20:
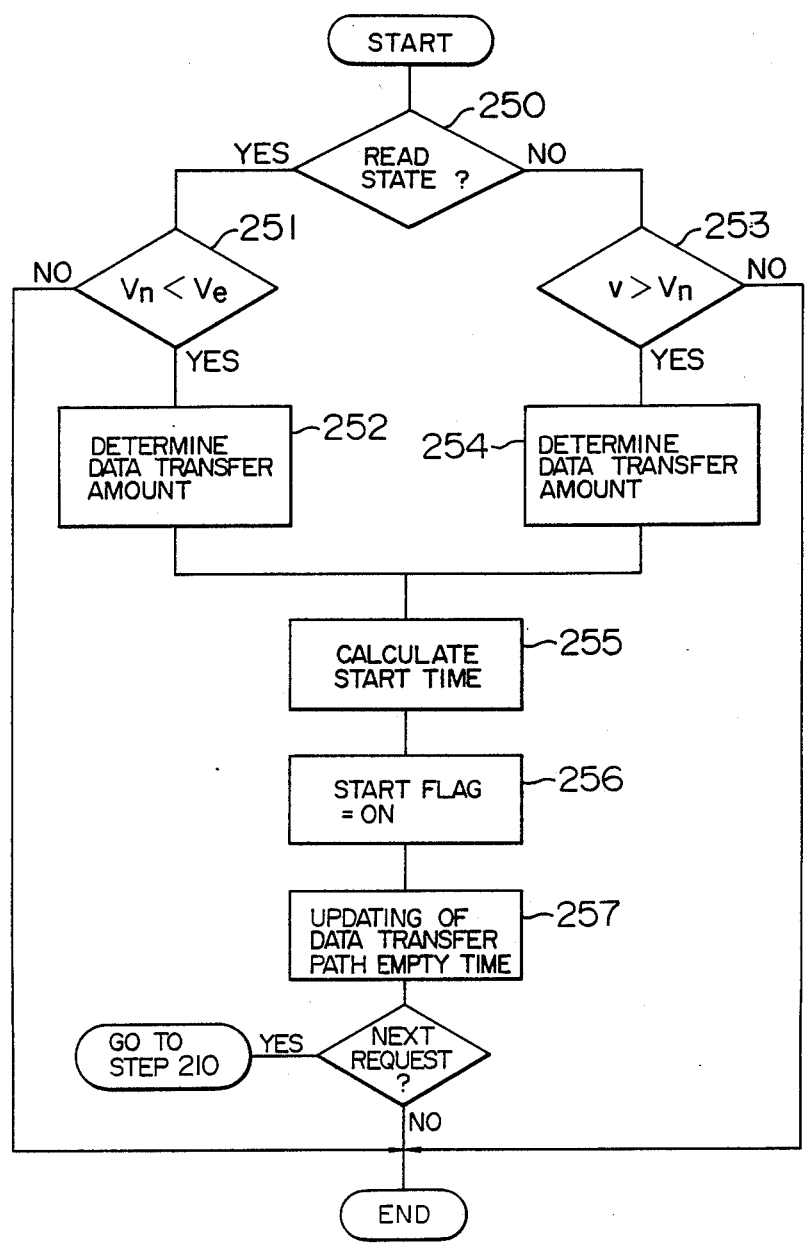
Figure 21:
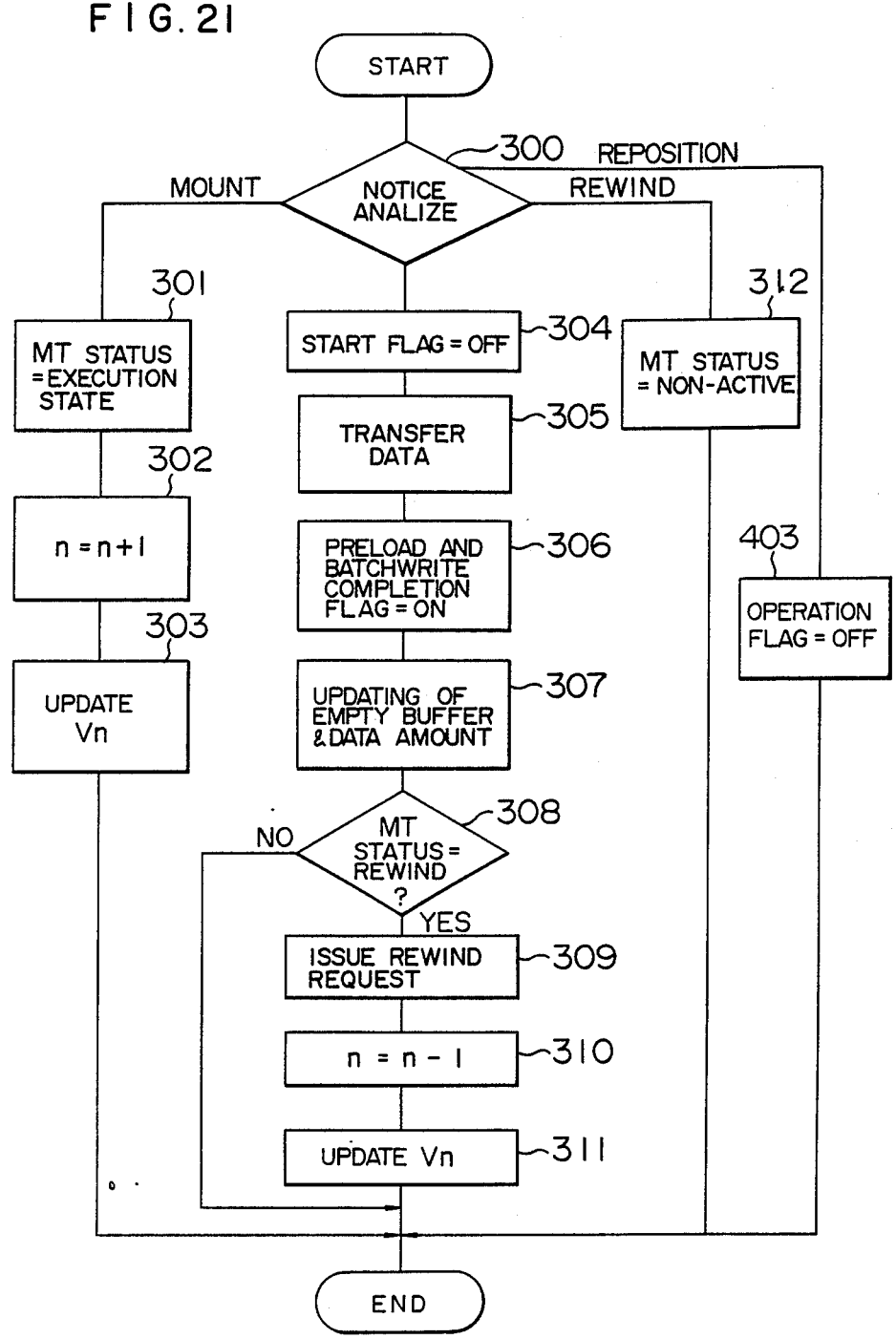

FIGS. 19 to 21 are flow charts for the processor 11.

The processor 11 repeats the processes shown in FIG. 19. First, it is determined whether any completion notice received from an MT is present (step 200). Next, it is determined whether a mount or rewind state is present in the MT status 81. After the end of the above processes, preloading and batchwriting is performed based on the data amount in the buffer 5. At step 200, if any completion notice is received from an MT, the processes shown in FIG. 21 are carried out (step 201). If not received, it is determined whether there is any MT whose MT status 81 is in a mount state (step 202). If so, it is determined whether the operation flag 86 is OFF or not (step 400). If it is found OFF, it is set to ON, and a mount request is issued to the MT (step 203) to further determine whether there is any MT whose status is in a rewind state (step 104). If present, the read/write status 82 is checked (step 205). If it is in a read state, it is further determined whether or not the operation flag is OFF (step 401) and if found OFF, it is set to ON and a rewind request is issued (step 206). If in a write state, it is decided that all data of the MT stored in the buffer 5 is to be batchwritten (transfer amount) (step 207) to thereafter make the start flag 85 ON (step 208). The next data transfer empty time is calculated from the data transfer amount determined at step 207, to thereby update the data transfer empty time 93 in the buffer management information unit 13 (step 209).

In the case where the difference between the data transfer empty times 93 before and after updating is less than the time necessary for start process (step 402), the flow jumps to step 210 in order to select the MT which is the next one to perform preloading and batchwriting. Next, the MT is selected whose data amount v 83 (in case of a read process, V/n−v) is the largest (step 210), and during operation of the MT it is determined whether the operation flag 26 is OFF (step 211). V represents a buffer capacity, and n represents the number of active MTs. If the operation flag 26 is ON, it is determined whether there is the MT whose data amount v (or V/n−v) is the second largest (step 212). If present, the flow returns to step 211. If not present, the flow returns to step 200. If the operation flag 28 is OFF at step 211, the processes shown in FIG. 20 are carried out (step 214). Thereafter, step 200 resumes.

FIG. 20 is a flow chart illustrating how a preloading and batchwriting request is issued.

First, it is determined whether it is a read state or not (step 250). If in a read state, it is determined whether empty buffer amount Ve in the buffer 5 is larger than the preloading amount Vn at that time (step 251). If the former is smaller than the latter, the process is terminated. If larger, the data transfer amount is set as Vn (step 252). If in a write state, it is determined whether the data amount v is larger than the batchwriting Vn (step 253). If smaller, the process is terminated. If larger, the data transfer amount is set as Vn (step 254). After determining the data transfer amount at steps 252 and 254, a start time is calculated (step 255). The calculation of a start time is carried out as follows. First, the data transfer empty time 93 is determined from the buffer management information unit 13. The data transfer empty time 93 at that time is reduced by the time required for the start process, the obtained time is supplied to the timer 8, and the start flag 85 is set to ON (step 256). Next, the time when the data transfer will complete is calculated based on the data transfer amount determined at steps 252 and 254, thereby updating the data transfer time 93 (step 257). In the case where the difference between the data transfer path empty times 93 before and after updating is found to be less than the time required for a start process, the flow jumps to step 210 in order to select the MT which is the next one to perform preloading and batchwriting.

FIG. 21 is a flow chart showing the processes where any completion notice from an MT is received at step 200. Completion notices from an MT include a mount completion, a start process completion, and a rewind process completion. The kind of completion notice received is determined (step 300). In case of a mount completion notice, then the operation flag 86 is made set to OFF and MT status 81 is made in an execution state (step 301). The number 90 of active MTs is incremented by one (step 302), and the preloading and batchwriting amount Vn as a function of the number n of active MTs is updated (step 303). In the case of a start completion notice, the start flag 85 is set to OFF (step 304) to transfer the data (step 305). After completion of data transfer, the preloading and batchwriting flag 87 is made set to ON (step 306), and the empty buffer amount 91 and the data amount 83 are updated (step 307). Next, it is determined whether the MT status 81 is in a rewind state (step 308). If not, the process is terminated. If in a rewind state, then a rewind request is issued (step 309). The number of active MTs is reduced by one (step 310), and the preloading and batchwriting amount Vn is updated (step 311). In the case of a rewind completion notice, the operation flag 86 is set to OFF and the MT status 81 is set to a non-active state (step 312). In the case of a repositioning completion notice, the operation flag 86 is set to OFF (step 403).

As seen from the present embodiment, it is possible to achieve with a minimum buffer size a continuous data transfer via the data transfer path between an I/O device and I/O control unit, the start process of the I/O device prior to data transfer being off-line processed from the I/O control unit.

As seen from the foregoing description of the embodiment, it is possible to achieve continuous data transfer with a minimum buffer size. Therefore, improvement on the throughput of the system and minimization of the buffer size are possible.

In the above embodiment, the MTs receive instructions to initiate the start process from the timers provided in the MTs. However, it is also possible to use an additional control information path for this purpose. More specifically, by issuing start instructions to one MT through this control information path at a time which is earlier than the data transfer completion time of another MT under data transfer by the time length necessary for the start process, continuous data transfers of different MTs become possible.

Figure 22:
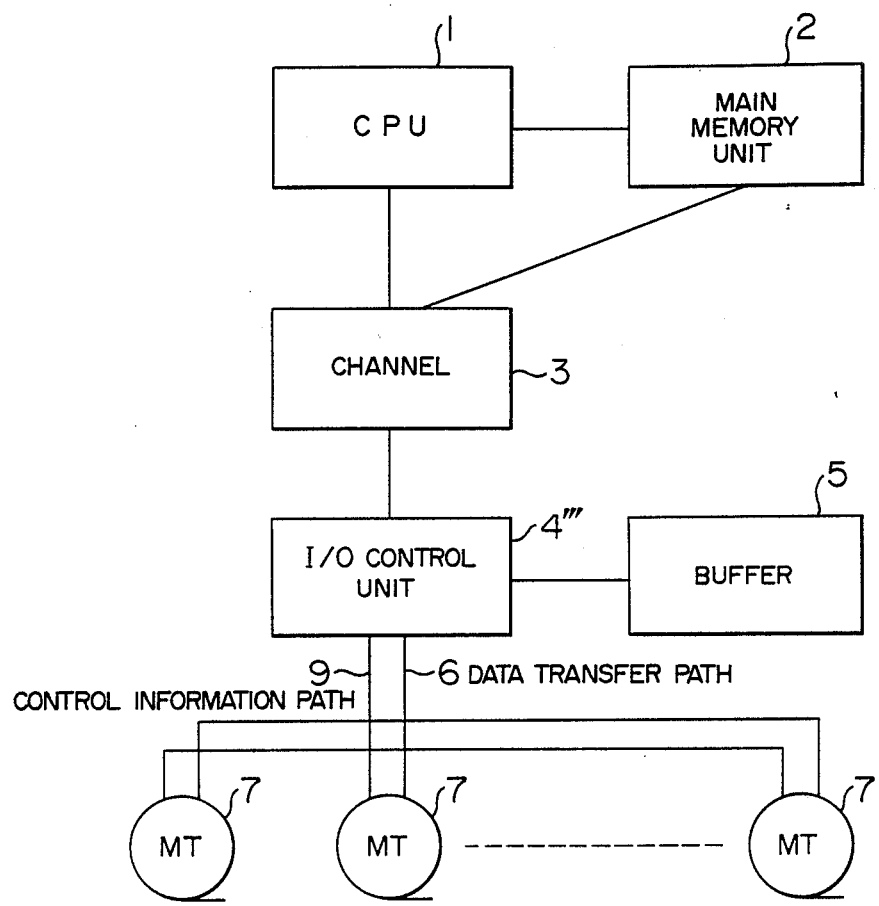
FIG. 22 shows another embodiment.

FIG. 22 shows an embodiment achieving the above. In the figure, an I/O control unit 4'''', which has almost the same function as that of the I/O control unit 4''''of FIG. 10, issues a request for start process of one MT at a time, earlier by the time necessary for its start process, through the control information path so that the start process of the one MT is completed just when data transfer between another MT 7 and the buffer is completed.

The present invention is applicable not only to a cartridge type magnetic tape without a vacuum column, but also to any I/O device whose start process prior to the data transfer is off-line processed from an I/O control unit and whose time required for the start process has a deterministic distribution. The invention is also applicable to a conventional open-reel type magnetic tape device whose vacuum column is removed.

We claim:

1. An I/O device control system comprising:
   a plurality of I/O devices, each I/O device being adapted for off-line starting and for data transfer, with a known starting time required for such off-line starting and with a known data transfer rate;
   a central processing unit;
   channel means coupled to said central processing unit for requesting operation of an I/O device designated by said central processing unit;
   I/O control means coupled to said channel means for controlling data transfer between said channel means and said I/O devices, said I/O control means responsive to a request by said channel means that one of said I/O devices be started for issuing a start request to start said one I/O device, said I/O control means including means for calculating a transfer completion time point at which said one I/O device will complete data transfer, such calculation being based on the known starting time, the known data transfer rate, and a known amount of data being transferred; and
   data transfer path means coupled between said I/O control means and I/O devices for transferring data between said channel means and said I/O devices, said data transfer path means being capable of transferring data for only a single I/O device at a time,
   said I/O control means including means responsive to a request by said channel means that another I/O device be started for starting said another I/O device at such a time that the starting of said another I/O device is completed at the calculated transfer completion time point of said one I/O device.

2. An I/O device control system according to claim 1, wherein each of said plurality of I/O devices includes a timer, and said I/O control means includes means for setting each of said timers so that at least one of said I/O devices is started after a lapse of a desired time.

3. An I/O device control system according to claim 2, wherein said I/O control means includes means for calculating a start time point at which said another I/O device is to be started based on the known starting time of said another I/O device and the calculated transfer completion time point of said one I/O device, said I/O control means including means for issuing the start request for said another I/O device via said data transfer path means to said another I/O device when said data transfer path means is not transferring data and said one I/O device has received the issued start request, the another start request setting the timer of said another I/O device for the calculated start time point.

4. An I/O device control system according to claim 2, further comprising a buffer coupled the said I/O control means for storing therein blocks of data which are successively read out from said I/O devices regardless of whether said data blocks have been requested by said channel means and for successively writing into said I/O devices other blocks of data which have been read out from said channel means and have been stored in said buffer.

5. An I/O device control system according to claim 4, wherein said known amount of data being transferred is determined such that at least one I/O device is under data transfer at all times during a period starting from the time that said one I/O device completes its data transfer and ending at the time that said one I/O device again starts its data transfer.

6. An I/O device control system according to claim 5, wherein the amount of each data block is defined by:

$$Vn = 4st/(n-1),$$

where $Vn$ is the amount of data in the data block, $n$ is the number of active I/O devices and $n \neq 1$, $s$ is the time required for starting an I/O device, and $t$ is the data transfer rate of an I/O device.

7. An I/O device control system according to claim 1, further comprising means defining a control information path between said I/O control means and each I/O device, and wherein said I/O control means includes means for calculating the start time point of said another I/O device so as to complete the starting of said another I/O device at the calculated transfer completion time point, and means for issuing a start request to said another I/O device via said control information path at the calculated start time point.

8. An I/O device control system according to claim 7, further comprising a buffer coupled to said I/O control means for storing therein blocks of data which are successively read out from said I/O devices regardless of whether said data blocks have been requested by said channel means and for successively writing into said I/O devices other blocks of data which have been read out from said channel means and have been stored in said buffer.

9. An I/O device control system according to claim 8, wherein said known amount of data being transferred is determined such that at least one I/O device is under data transfer at all times during a period starting from the time that said one I/O device completes its data transfer and ending at the time that said one I/O device again starts its data transfer.

10. An I/O device control system according to claim 9 wherein the amount of each data block is defined by:

$$Vn = 4st/(n-1),$$

where $Vn$ is the amount of data in the data block, $n$ is the number of active I/O devices and $n \neq 1$, $s$ is the time required for starting an I/O device, and $t$ is the data transfer rate of an I/O device.

11. A data transfer control system for an I/O system, comprising:
   a plurality of I/O devices, each I/O device being adapted for off-line starting and for data transfer with a known starting time required for such off-line starting and with a known data transfer rate;
   a central processing unit;
   channel means coupled to said central processing unit for requesting operation of an I/O device designated by said central processing unit;
   I/O control means coupled to said channel means for controlling data transfer between said channel means and said I/O devices, said I/O control means responsive to a request by said channel means that one of said I/O devices be started for issuing a start request to start said one I/O device, said I/O control means including means for calculating a transfer completion time point at which said one I/O device will complete the data transfer, such calculation being based on the known starting time, the known data transfer rate, and a data transfer amount designated by said central processing unit; and data transfer path means coupled between said I/O control means and said I/O devices for transferring data between said channel means and said I/O devices, said data transfer path means being capable of transferring data for only a single I/O device at a time, said I/O control means including means for issuing a start request for starting another I/O device via said data transfer path means during a time period between (a) a data transfer preceeding a data transfer involving said one I/O device and (b) the data transfer involving said one I/O device, in which time period said data transfer path means is not transferring data.

12. An I/O control unit for controlling data transfer via a data transfer path and controlling a plurality of I/O devices, each I/O device having a starting time required for starting of the I/O device, all the starting times being a constant, said I/O control unit comprising:

processor means for performing a data transfer process and controlling the driving of the I/O devices;

a clock for indicating current time;

management information storage means for storing information identifying a time point at which the data transfer path is released from data transfer and identifying the starting times required for starting of the I/O devices;

said processor means including means responsive to an I/O request from one of the I/O devices for calculating a start time point of the one I/O device and for issuing a start request to the one I/O device at the calculated start time point, the calculated start time point being based on the identified time point at which the data transfer path is released from data transfer, the current time, and the identified starting time required for starting of one I/O device, whereby following the data transfer completion of another I/O device under data transfer, data transfer for the one I/O device can be started.

13. An I/O control unit according to claim 12, further comprising a plurality of I/O devices, each of said I/O devices including a timer; and wherein said processor means, issues the start request to the one I/O device while the data transfer path is not transferring data and sets timer of the one I/O device at the calculated start time point.

14. An I/O control unit according to claim 12, further comprising a plurality of I/O devices, and means defining a control information path between said control unit and said plurality of I/O devices; and wherein said processor means further comprises a timer, means for setting said timer to the calculated start time point, and means for issuing the start request to the one I/O device through said control information path.

15. An I/O control unit according to claim 12 wherein said processor means includes means for updating the identified time point based on the data transfer time of the I/O devices.

16. An I/O control unit for controlling an I/O system including a plurality of I/O devices, each I/O device having a timer and having a starting time required for starting of the I/O device, all the starting times being a constant; a buffer coupled to said I/O control unit; a central processing unit; a channel coupled to the central processing unit and to said I/O control unit to access an I/O device designated by the central processing unit; and a data transfer path connecting said I/O control unit with the I/O devices, the data transfer path adapted to allow only one I/O device to be coupled to said I/O control unit at a time; said I/O control unit comprising:

first processor means for controlling data transfer between the channel and the buffer;

second processor means for controlling data transfer between the buffer and each I/O device;

I/O management information storage means for storing information on the I/O devices;

buffer management information storage means for storing information on a time point at which the data transfer path is released from data transfer, the number of active I/O devices, and the amount of empty buffer space in the buffer;

said first processor means including means responsive to transfer of data between the channel and the buffer for updating the empty buffer space amount and the number of active I/O devices; and means for calculating the amount of data to be loaded from the I/O devices to the buffer and the amount of data to be written in the I/O devices from the buffer; and said second processor means including means for determining the amount of data to be transferred between the buffer and the I/O devices; means for calculating, on the basis of the determined amount, a transfer time point at which the data transfer path is to be released from data transfer; means for updating the stored time point information based on the calculated transfer time point; means for calculating a start time point for one I/O device to which data is to be transferred based on said determined amount; and means for setting the calculated start time point in the timer of the one I/O device.

17. An I/O device control system comprising:

(a) a plurality of I/O devices, each I/O device being adapted for off-line starting and for data transfer, with a known starting time required for such off-line starting and with a known data transfer rate;

(b) channel means for requesting operation of an I/O device;

(c) a buffer; and (d) I/O control means coupled to said channel means, to said buffer and to said I/O devices, for controlling data transfer between said I/O devices and said buffer and between said buffer and said channel means, said I/O control means including:

(1) means for storing blocks of data which are successively read out from said I/O devices into said buffer regardless of whether said data blocks have been requested by said channel means, and for successively writing into said I/O devices other blocks of data which have been read out from said channel means and have been stored in said buffer;

(2) means for calculating a transfer completion time point at which one of said I/O devices will complete data transfer, such calculation being based on the known starting time, the known data transfer rate, and a known amount of data being transferred; and (3) means for starting another I/O device at such a time that the starting of said another I/O device is completed not earlier than the calculated transfer completion time point of said one I/O device.

18. An I/O device control system according to claim 17, wherein said I/O control means further includes means for starting one of said I/O devices when none of said I/O devices is starting or transferring data.

19. An I/O device control system comprising:
(a) a plurality of I/O devices, each I/O device being adapted for off-line starting and for data transfer, with a known starting time required for such off-line starting and with a known data transfer rate:
(b) a central processing unit;
(c) channel means coupled to said central processing unit for requesting operation of an I/O device designated by said central processing unit; and
(d) I/O control means coupled to said channel means and to said I/O devices for controlling data transfer between said I/O devices and said channel means, said I/O control means responsive to a request by said channel means that one of said I/O devices be started for issuing a start request to start said one I/O device, said I/O control means including:
(1) means for calculating a transfer completion time point at which said one I/O device will complete data transfer, such calculation being based on the known starting time, the known data transfer rate, and a known amount of data being transferred; and
(2) means responsive to a request by said channel means that another I/O device be started for starting said another I/O device at such a time that the starting of said another I/O device is completed not earlier than the calculated transfer completion time point of said one I/O device.

20. An I/O device control system according to claim 19, wherein said I/O control means further includes means for starting one of said I/O devices when none of said I/O devices is starting or transferring data.

21. An I/O device control system comprising:
(a) a plurality of I/O devices, each I/O device being adapted for off-line starting and for data transfer, with a known starting time required for such off-line starting and with a known data transfer rate;
(b) channel means for requesting operation of an I/O device;
(c) a buffer; and
(d) I/O control means coupled to said channel means, to said buffer and to said I/O devices, for controlling data transfer between said I/O devices and said buffer and between said buffer and said channel means, said I/O control means including:
(1) means for storing blocks of data which are successively read out from said I/O devices into said buffer regardless of whether said data blocks have been requested by said channel means, and for successively writing into said I/O devices other blocks of data which have been read out from said channel means and have been stored in said buffer;
(2) means for calculating a transfer completion time point at which one of said I/O devices will complete data transfer, such calculation being based on the known starting time, the known data transfer rate, and an expected amount of data being transferred; and
(3) means for starting another I/O device at such a time that the starting of said another I/O device is completed not earlier than the calculated transfer completion time point of said one I/O device.

22. An I/O device control system comprising:
(a) a plurality of I/O devices, each I/O device being adapted for off-line starting and for data transfer, with a known starting time required for such off-line starting and with a known data transfer rate:
(b) a central processing unit;
(c) channel means coupled to said central processing unit for requesting operation of an I/O device designated by said central processing unit; and
(d) I/O control means coupled to said channel means and to said I/O devices for controlling data transfer between said I/O devices and said channel means, said I/O control means responsive to a request by said channel means that one of said I/O devices be started for issuing a start request to start said one I/O device, said I/O control means including:
(1) means for calculating a transfer completion time point at which said one I/O device will complete data transfer, such calculation being based on the known starting time, the known data transfer rate, and an expected amount of data being transferred; and
(2) means responsive to a request by said channel means that another I/O device be started for starting said another I/O device at such a time that the starting of said another I/O device is completed not earlier than the calculated transfer completion time point of said one I/O device.

* * * * *